United States Patent

Toyama et al.

[11] 3,955,887
[45] May 11, 1976

[54] MOTION PICTURE CAMERA

[75] Inventors: Masamichi Toyama; Tomoshi Takigawa, both of Machida; Noritsugu Hirata; Keiichi Sakaguchi, both of Yokohama; Toshikazu Ichiyanagi, Tokyo, all of Japan

[73] Assignee: Canon Kabushiki Kaisha, Tokyo, Japan

[22] Filed: May 22, 1974

[21] Appl. No.: 472,475

[30] Foreign Application Priority Data

May 28, 1973 Japan............................. 48-59619

[52] U.S. Cl.............................. 352/166; 352/190; 352/141
[51] Int. Cl.²......................................... G03B 1/00
[58] Field of Search ........... 352/166, 186, 187, 190, 352/141, 194, 216

[56] References Cited
UNITED STATES PATENTS

| | | | |
|---|---|---|---|
| 647,529 | 4/1900 | Schneider | 352/190 |
| 714,845 | 12/1902 | White | 352/190 |
| 1,851,448 | 3/1932 | Ross | 352/190 X |
| 3,421,812 | 1/1969 | Kubota | 352/141 |
| 3,787,116 | 1/1974 | Shimizu | 352/216 |

Primary Examiner—Monroe H. Hayes
Attorney, Agent, or Firm—Toren, McGeady and Stanger

[57] ABSTRACT

The present invention refers to a motion picture camera which is characterized in that respectively on the driving shaft to be rotated by means of a driving power from the driving motor and on the shutter shaft to be rotated by means of a rotating power of the above mentioned driving shaft elliptical gears in mutual engagement with each other are provided in such a manner that the ratio of the angular speed to be communicated between the driving shaft and the shutter shaft is continuously increased and decreased while on the above mentioned shutter shaft a non-circular cam to reciprocate the claw for feeding film is provided in such a manner that while the shutter blade is opened the shutter shaft rotates slowly and further the claw for feeding film stops feeding film whereby the effective proper opening angle of the shutter blade is changed largely by means of the above mentioned pair of elliptical gears and the non-circular cam.

36 Claims, 17 Drawing Figures

MOTION PICTURE CAMERA

BACKGROUND OF THE INVENTION

1. Field of the Invention

The present invention relates to a motion picture camera.

2. Description of the Prior ARt

Most conventional 8mm motion picture cameras are mainly used in day-light due to the efficiencies of the film used and thus employ shutters with opening angles of about 160°.

This means that the standard number of pictures of the present super eight motion picture camera namely 18 pictures in a second corresponds to the exposure time of about 1/40 second.

Recently, efforts have been directed at making 8mm motion picture cameras usable for night photography. To do this motion picture film has been made more sensitive and the shutter opening angle of the cameras used has been increased from 160° to 230°.

This means that the exposure time of the standard number of the 18 pictures in a second corresponds to about 1/28 second. This permits photographing of an object which is darker by 0.5 EV than the conventional exposure time of 1/40 second. For this reason it has become possible to photograph much darker objects and in a TV camera the scanning bar cannot be noticed. However the increase of the exposure time may cause blurring of an object in motion or due to movement of the camera.

SUMMARY OF THE INVENTION

The first purpose of the present invention is to offer a motion picture camera in which it is possible to enlarge the effective proper opening angle of the shutter blade by rotating the shutter shaft while the shutter blade is opened and stopping the feeding of film by means of the film feeding claws.

The second purpose of the present invention is to offer a motion picture camera in which it is possible to enlarge the effective proper opening angle of the shutter blade by providing elliptical gears in mutual engagement with each other on the driving shaft to be rotated by the rotating power from the driving motor and on the shutter shaft to be rotated by the rotating power from the above mentioned driving shaft in such a manner that the ratio of the angle speed of the rotation communicated between the driving shaft and the shutter shaft is continuously increased and decreased and at the same time by providing on the above mentioned shutter shaft a non-circular cam for reciprocating the film feeding claws.

The third purpose of the present invention is to offer a motion picture camera which is equipped with the improved driving mechanism for enabling the increase of the opening angle of the shutter blade.

The fourth purpose of the present invention is to offer a motion picture camera in which the adjustment of the light exposure is also possible in functional engagement with the enlargement of the effective proper opening angle of the shutter blade.

The further other purposes of the present invention will be explained in detail according to the present patent specification and the attached drawings of the embodiments.

Figure 10:
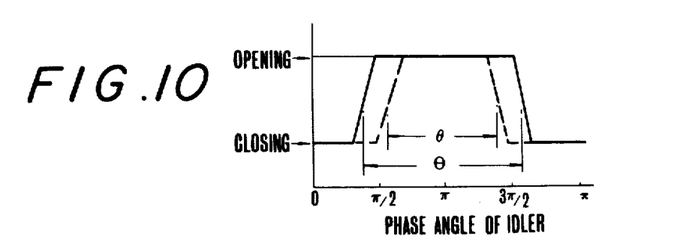
FIG. 10 is a diagram of the total opening and closure of the aperture to the phase angle of the idler gear.

FIGS. 1 to 17 show a film feeding mechanism to be used in the motion picture camera according to the present invention. Here it is possible to enlarge the effective proper opening angle of the shutter blade by rotating the shutter shaft slowly and stopping the film feed by the film feeding claws while the shutter blade is opened. As most particularly shown in FIGS. 4 and 5, the film feeding claw 26 is rotatably pivoted by the shaft 90 and slidable on the shaft 90 and drawn by the spring 91. The above mentioned film feeding claw 26 presents a claw edge 26a, a photographing aperture 26c and an aperture 26d for engagement with the non-circular cam 25, and is equipped with the claw nob 26b in touch with the face cam 24. 28 is the shutter shaft presenting the shutter blade at the one end while on the other end of the shutter shaft 28 the face cam and the non-circular cam 25, for example, a triangle cam 25 in engagement with the above mentioned aperture 26d are adapted. This film feeding claw 26 and the triangle cam form the film feeding means, whereby the enlargement of the effective proper opening angle of the shutter blade is already known (DIE KINEMATOGRAPHISCHE KAMERA, VON HAROLD WEISE, DIE WISSENSCHAFTLICHE UND ANGEWANDTE PHOTOGRAPHIE 1955, p. 217). The shape of the above mentioned triangle cam 25 which engages with the aperture 26d of the film feeding claw 26 is desirable to be designed as follows:

$$\sin \frac{\beta}{2} = \frac{1}{2} \cdot \frac{R_1 - r_1}{R_n - r_1} \quad (1)$$

$$R_n \cdot r_n = k = \text{constant} \quad (2)$$

$$R_n + r_n = R_1 + r_1 = D \quad (3)$$

whereby as shown in FIG. 10, $o$ : Rotation center of the triangle cam $\beta$ : Angle in which the film feeding claw stands still at the upper and the lower dead point $D$ : Length of the aperture 26d of the film feeding claw, catching the triangle cam 25

$K$ : Stroke of the film feeding claw produced by one rotation of the triangle cam It is clear from the above that in order to enlarge the opening angle of the shutter it is sufficient to take the angle $\beta$ at which the film feeding claw 26 stands still at the upper and the lower dead point as large as possible, for which it is sufficient to make $r_1$ zero ($r_1 = 0$).

The reason is that when the equations (2) and (3) are put into the equation (1) the following equation is obtained $$\sin \frac{\beta}{2} = \frac{D - 2r_1}{D + k - 2r_1} \quad (4)$$

whereby the right term decreases monotonously when $r_1$ is considered as a variable and the maximum value of the right term takes place when $r_1 = 0$. Thus when $r_1 = 0$, $\sin \beta/2$, namely $\beta$ becomes maximum. It is also clear from the equation (4) that to enlarge $\beta$ further larger it is sufficient to make $D$ larger. Further it is understood that the length $l_1$ between the rotation center O of the triangle cam 25 and the feeding claw know 26b is to be taken larger in order to make the dimension ($D$) of the triangle cam. Namely the diameter of the face cam 24 should also be made larger. However it becomes also necessary to make the length $l_2$ between the rotation center O of the triangle cam 25 and the center of the aperture light path 37 larger in case the length $l_1$ between the rotation center O of the triangle cam 25 and the film feeding knob 26 b is taken larger because the face cam has to be disposed outside of the aperture light path 37, whereby the light shielding effect at the film feeding becomes inferior if the radius $l_3$ of shutter blade is not taken larger. The enlargement of the radius $l_3$ of the shutter blade 36 means the enlargement of the device itself, which is contradictory to the demand toward the motion picture camera whose compactness is requested.

The present invention proposes a disposition to make the face cam 24 on the shutter shaft to solve the above mentioned difficulties that further to the effective enlargement of the proper opening angle of the shutter blade 36 by means of the film feeding claw 26 and of the triangle cam the elliptical gears 23 and 19 in mutual engagement with each other are provided on the driving shaft to be rotated by the rotation power from the driving motor and the shutter shaft to be rotated by the rotation power of the above mentioned driving shaft in such a manner that the proper opening angle of the shutter blade 36 is enlarged.

The effect of the above mentioned disposition will be explained below according to FIGS. 7–10.

Figure 1:
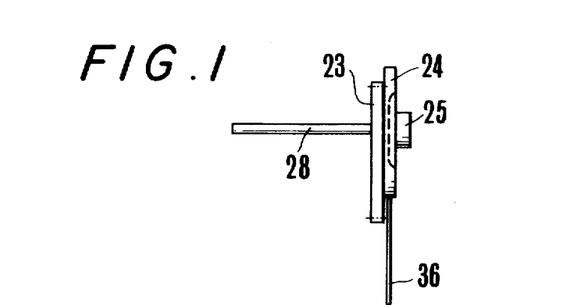
FIG. 1 shows a side view of the film feeding claw control means which is a part of the film feeding mechanism to be used in the motion picture camera according to the present invention. Here it is possible to enlarge the effective proper opening angle of the shutter blade by rotating the shutter shaft while the shutter blade is opened and then stopping the film feeding by film feeding claws.
Figure 2:
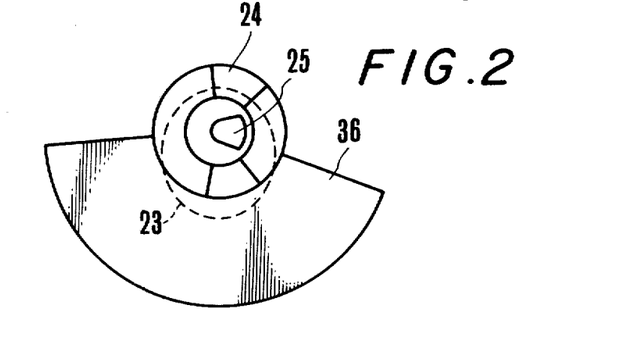
FIG. 2 is a front view of the film feeding claw control means shown in FIG. 1.
Figure 3:
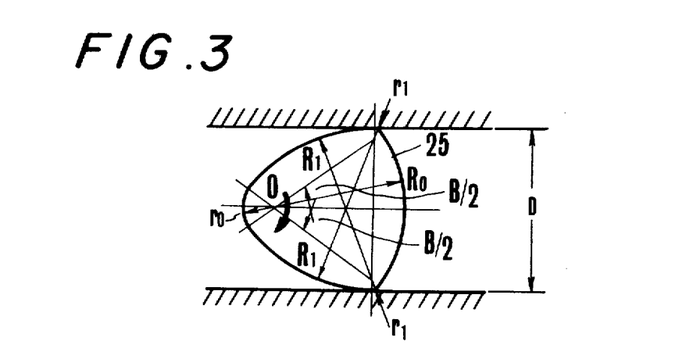
FIG. 3 is an enlarged view of the non-circular cam of the film feeding claw control means shown in FIGS. 1 and 2.
Figures 4, 5, 6:
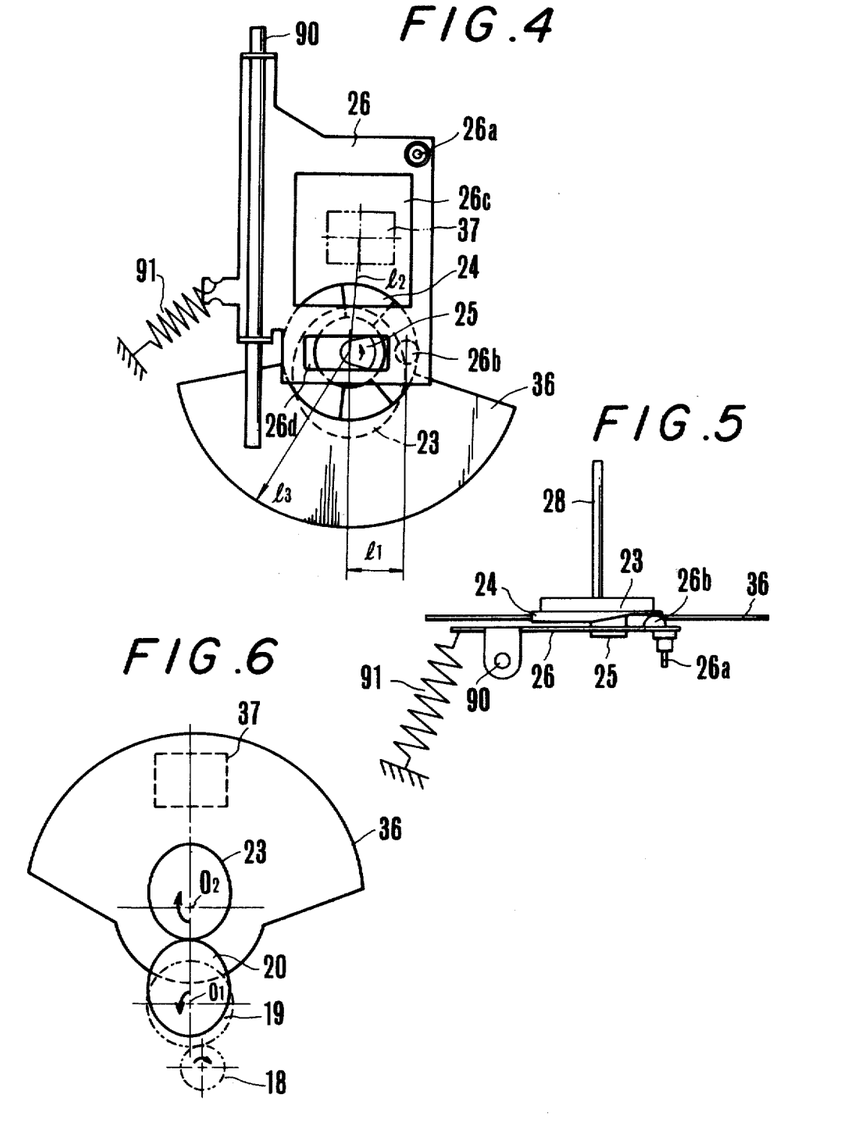
FIG. 4 is a plane view of the film feeding mechanism according to the present invention.
FIG. 5 is a side view of the film feeding mechanism shown in FIG. 4.
FIG. 6 is a front view of the elliptical gears 20 and 23 disposed when the shutter blade 36 covers the aperture part 37 in the film feed mechanism.

FIG. 6 shows a state in which the shutter blade 36 stands still, covering the aperture 37 after finishing an ordinary exposure. At this time the longer axis of the above mentioned elliptical gear 23 and that of the above mentioned gear 20 are in alignment with each other while the rotation centers are situated at the focus points of the gears as shown in the drawing.

Due to the engagement of the elliptical gears with each other the angular speed of the shutter shaft is varied while the idler gear 19 driven by the driving power from the motor rotates at a constant speed. The variation of the angular speed is explained below.

Figure 7:
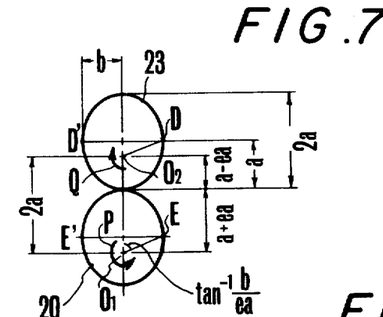
FIG. 7 is a drawing for explaining the engaged state of the elliptical gears 20 and 23 shown in FIG. 6.
Figure 8:
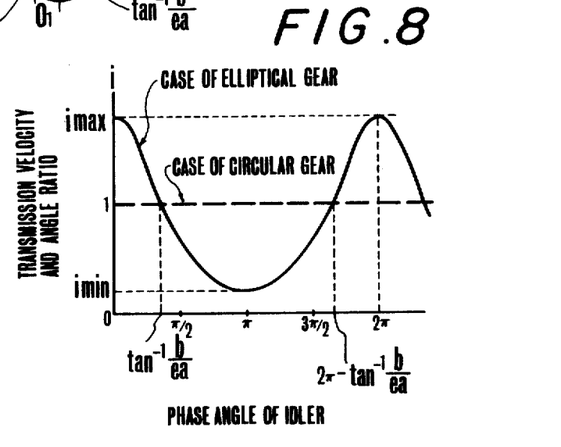
FIG. 8 is a diagram of the ratio of the angle speed between both elliptical gears 20 and 23 shown in FIG. 7 to the phase angle of the idler gear along the abcissa.

FIG. 7 shows the elliptical gears 23 and 20 shown in FIG. 6, whereby both gears are shown as ellipsis for the sake of simplicity. The idler gear 20 has the same shape as the shutter gear 23 whereby the length of their longer axis is considered to be $2a$, while that of the shorter axis $2b$. When the radius from the rotation center $O_1$ of the idler gear 20 to the engagement point with the shutter gear 23 is represented in $a_1$ and the radius from the rotation center $O_2$ of the shutter gear 23 to the engagement point with the idler gear 20 in $a_2$, the ratio of the rotation angular speeds $i$ transmitted from the idler gear 20 to the shutter gear 23 can be represented in $a_1/a_2$. Let the eccentricity of both elliptical fears 23 and 20 be $e$, their dimensions are as shown in FIG. 7. Below the maximum and the minimum ratio of the rotation angular speeds will be obtained. Now the rotation phase angle of the idler gear 20 and of the shutter gear 23 come to play an important part. Suppose that at the beginning both gears assume the position as shown in FIG. 7 at which their rotation phase angle is zero, are rotated along the direction of the arrows P and Q by 360° and resume the initial position, during which one cycle one picture is exposed and the already exposed picture is fed, the maximum ratio of the transmitted angular speeds takes place at the position shown in FIG. 7, namely when the rotation phase angle of the idler gear is 0 whereby $i$ max $= a + ea/a - ea$ while the minimum ratio of the transmitted angular speeds takes place when the rotation phase angle of the idler gear 20 is $\pi$, whereby $i$ min $= a - ea/a + ea$. On the other hand the ratio of the transmitted angular speeds becomes 1 when the distances between the rotation center $O_1$ respectively $O_2$ and the engaging point are equal to each other, namely when $D$ engages with $E$ and $D'$ with $E'$ in the drawing, whereby the rotation phase angle of the idler gear is $\tan^{-b/a}$, respectively $2\pi - \tan^{-b/a}$. On the other hand, the eccentricity $e = 0$ when both of the gears 23 and 20 are circular so that the then ratio of the transmitted angular speed is always 1. FIG. 8 shows then variation of the ratio of the transmitted angular speeds during one cycle whereby the abcissa shows the rotation phase angle (in radian) of the idler gear, where the ordinate shows the ratio $i$ of the transmitted angular speed.

Figure 9:
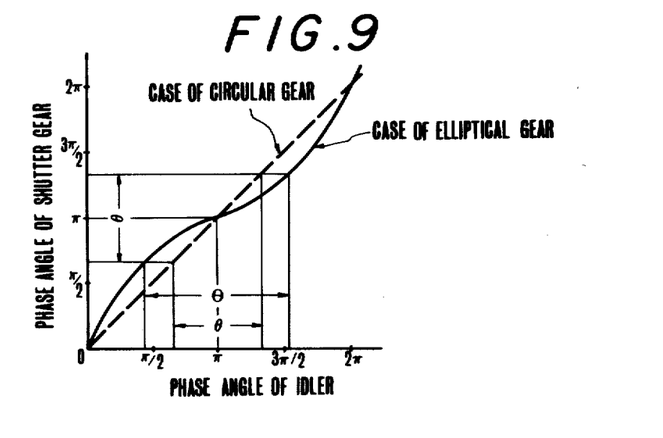
FIG. 9 is a diagram of the phase angle of the shutter gear to that of the idler gear.

The case with the elliptical gears as shown in FIG. 7 is shown in full line while the case with the circular gears in broken line. It is clear from the drawing that as compared with the case with circular gears the ratio of the transmitted angular speeds with elliptical gears is varied periodically. FIG. 9 shows the comparison between the variation of the rotation phase angle of the idler gear 20 and that of the shutter gear for helping easy comprehension. Hereby the rotation phase angle of the idler gear along the abcissa as well as that of the shutter gear along the ordinate is shown in radian. In the drawing the advance respectively the delay of the rotation phase of the shutter gear 23 driven by the idler gear 20 to that of the idler gear 20 is shown clearly. As the rotation phases of the circular gears are shown in broken lines in the drawing there is neither advance nor the delay in the phase of the shutter gear to the idler gear, while in case of the engagement between the elliptical gears 20 and 23 the rotation phase angle of the shutter gear 20 is in advance for the range of the rotation phase angle of the idler gear 23 between 0 and $\pi$ and in delay for the range between $\pi$ and 2.

In short the advance and the delay of the rotation phase of the shutter gear 20 to the idler gear 23 is reversed smoothly at each half rotation of the idler gear. The shutter blade 36 secured on the shutter gear 20 presents an opening angle $\theta$ of about 230°, whereby when the shutter shaft is started to be rotated from the position shown in FIG. 6 the aperture part 37 of the camera is in opened state ± about 115° of the 180° at the rotation center of the shutter gear 20. FIG. 9 shows the opening angle $\theta$ of the totally opened shutter blade on the phase angle of the shutter gear, whereby the shutter gear 20 has the advance and the delay of the rotation phase to the idler gear as mentioned above, so that when represented in the phase angle of the idler gear, the effective opening angle is larger than the opening angle $\theta$ in case of the ordinary circular gear as is shown in $\Theta$. FIG. 10 shows the above mentioned state in the time length in which the aperture 37 is totally opened respectively totally closed, whereby the abcissa shows the rotation phase angle of the idler gear is represented in radian for the sake of convenience. Hereby the number of rotation of the idler gear 23 is constant so that the abcissa can be considered as factor of the time for one cycle. The effective time of the opening angle of the time length $\theta$ of the totally opened aperture in case of the ordinary circular gear as is shown in broken line can be prolonged as is shown in $\Theta$ by means of the elliptical gears according to the present invention. In other words this means that the conventional shutter opening angle of about 230° has effectively enlarged more than about 250°, which means that for the dark object which has so far been out of the proper exposure the range of the proper exposure has been enlarged so as to photograph such dark object. The time in which the aperture is totally closed namely the time needed for feeding the film is cut short by the prolonged part of the above mentioned proper exposure, while during this time the shutter shaft is driven faster so as to accelerate the feeding motion of the film feeding claw there is no problem. Further on the shutter shaft a face cam 24 and a non-circular cam 25 are respectively mounted so that the feeding operation of the film feeding claw is carried out in synchronization of the variation of the angular speed of the shutter shaft. Further the positioning of the non-circular cam 25 and of the shutter gear is easier when the face cam 24, the non-circular cam 25 and the shutter gear 23 are composed in one body.

As mentioned above the motion picture camera according to the present invention is constructed in such a manner that on the driving shaft to be rotated by the driving power from the driving motor and on the shutter shaft to be rotated by the rotation power from the above mentioned driving shaft elliptical gears in mutual engagement with each other are mounted in such a manner that the ratio of the transmitted angular speed between the driving shaft and the shutter shaft is continuously increased and decreased while on the above mentioned shaft a non-circular cam is provided so as to give reciprocal movements to the film feeding claw in such a manner that the shutter shaft is rotated slowly and the film feeding claw stops feeding film by means of the effect of the non-circular cam while the shutter blade opens the aperture, so that it is possible to enlarge the effective proper opening angle of the shutter blade by means of a pair of the above mentioned elliptical gears and of the above mentioned non-circular cam. Further the positioning of the non-circular cam and of the shutter gear is hereby easier when the face cam 24, the non-circular cam 25 and the shutter gear 23 are composed in one body. Hereby it is also possible to substitute the elliptical shutter gear 23 and the elliptical gear 20 with the friction members in order to eliminate the noise at driving.

Various embodiments in which the film feeding mechanism for the motion picture camera according to the present invention, shown in FIGS. 1–10 will be explained below.

Figure 11:
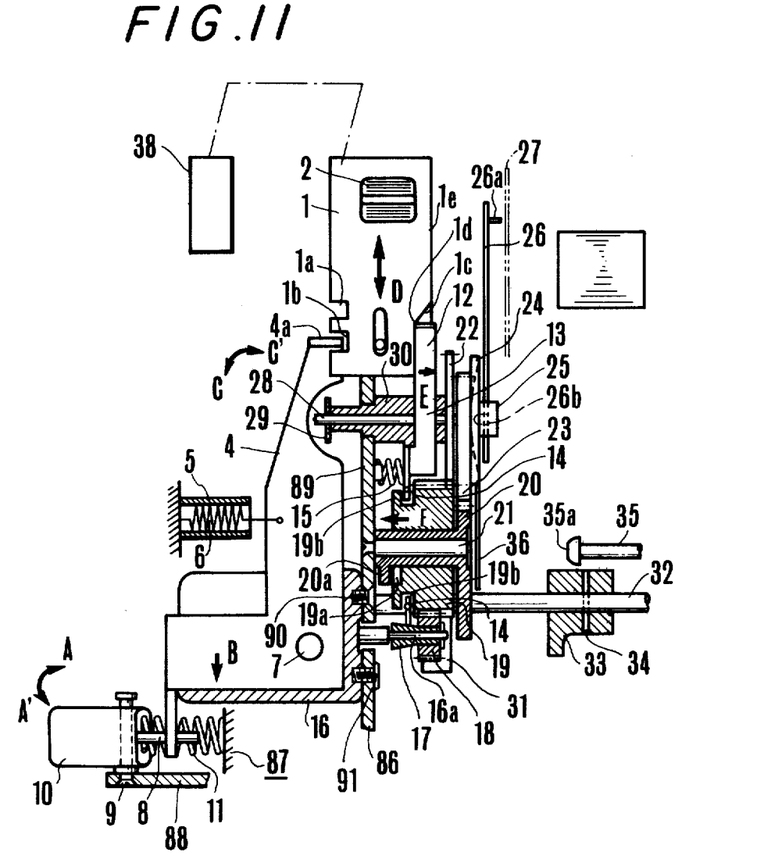
FIG. 11 is a side view of an embodiment of the switching over means of the shutter opening angle for the motion picture camera according to the present invention in which the film feeding mechanism shown in FIG. 4 is used.
Figure 12:
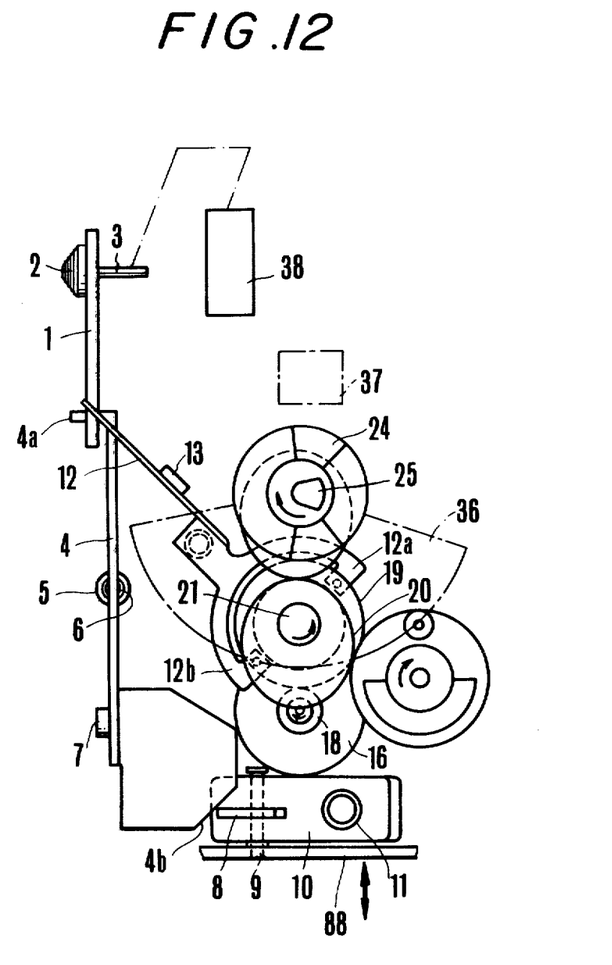
FIG. 12 is a front view of FIG. 11.

FIGS. 11 to 12 show an embodiment of the shutter driving mechanism of the motion picture camera according to the present invention whereby it has become possible to vary the effective opening angle of shutter. In the drawing a slide plate 1 switches the opening angle. It includes a lock groove 1a for the wide opening angle, a lock groove 1b for the narrow opening angle and stopper face 1d. An opening angle switchover knob is composed of a body with a pin 3 in functional engagement with the exposure light quantity adjusting circuit 38 to be explained in detail according to FIG. 13 and mounted on the above mentioned opening angle switching over slide. A switchover lock lever 4 carries a lock part 4a and a tapered part 4b to be engageable in the lock groove 1a for the wide opening angle and the lock groove 1b for the narrow opening angle of the opening angle switching slide plate 1. The lever 4 is pivoted rotatably about the shaft 7 secured on the camera body 87. A spacer containing a tension spring 6 provided between the above mentioned switching over lock lever 4 and the camera body 87 draws the lever 4 counter-clockwise. A trigger lever operating plate 8 mounted as one body on the trigger lever 10 is rotatably held by the trigger lever shaft 9 adapted on the plate 88 which is secured on the camera body. A compression spring 11 always draws the trigger lever 10 counter-clockwise. 30 is the shutter bearing provided in the support plate 89 of the shutter opening angle adjusting device and 28 the shutter shaft on which the shutter blade 36 is pivoted in the shutter bearing 30, the shutter circular gear 22, the shutter elliptical gear 23, the face cam 24 and the triangle cam 25 are secured, whereby its details are shown in FIGS. 8 to 12. 29 is the thrust stopper of the shutter shaft for limiting the translation of the shutter shaft 28 along the thrust direction. 19 is the idle circular gear presenting a projection 20a as one body, being pivoted rotatably on the idle shaft 21 provided on the supporting plate 89 and presenting grooves 19a and 19b in which the projection 20a of the idle elliptical gear 20 in engagement of the above mentioned elliptical gear 20 is engaged, whereby the idle circular gear 19 and the idle elliptical gear are independent from each other so as to carry out different rotating movement. 16 is a motor secured on the supporting plate 89 by means of the screw 90 and 91, whereby 16 a is the shaft of the motor 16, 17 is a friction member adapted on the motor shaft 16a and intended to convey the rotation power of the motor 16 to the motor gear 18 in engagement with the idle circular gear 19. 32 is a film winding transmission shaft bearing the film winding transmission gear 31 and presents the stopper wheel for braking the film winding transmission shaft 32 by means of the rotation stopping pin 34. 12 is the opening angle switching over lever being pressed at the one end against the stopper face 1d of the opening angle switching over slide plate 1 by means of a spring 15, engaged at the other end in the groove 19b of the idle circular gear 19 by means of a steel ball 14 and rotatably born on the shaft 13 in such a manner that when the opening angle switching lever 12 is rotated clockwise the lever 12 makes the idle circular gear 19 slide toward the supporting plate 89 by means of the steel ball 14 whereby in the groove 19a of the idle circular gear 19 the projection 20a of the idle elliptical gear 20 engages while the engagement of the idle circular gear 19 with the shutter circular gear 22 is dissolved in such a manner that the rotation of the idle circular gear 19 is transmitted to the idle elliptical gear 20 but not to the shutter circular gear 22. When on the contrary the opening angle switching over lever 12 is rotated anti-clockwise, the idle circular gear 19 is slided in an opposite direction to the supporting plate 89 by means of the steel ball 14 in such a manner that the idle circular gear 19 engages with the shutter circular gear 22 while the engagement of the projection 20a into the groove 19a of the idle circular gear 19 is solved so that the rotation of the idle circular gear 19 cannot be transmitted to the idle elliptical gear 20 any more. Hereby the groove 19b of the idle circular gear 19 and the projection 20a of the switching over lever 12 present elasticity at 12a and 12b in order to absorb the undesirable stress taking place at the engagement of the projection 20a of the switching over lever 12 into the groove 19a.

Figure 13:
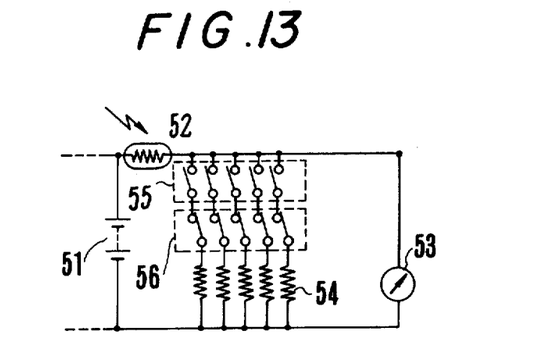
FIG. 13 is a circuit diagram for showing the exposure light adjusting means 38 shown in FIG. 11 more in detail by means of which in functional engagement with the switching over of the shutter opening angle by the shutter opening angle switching over means the light to be given to the film can be adjusted.
Figure 14:
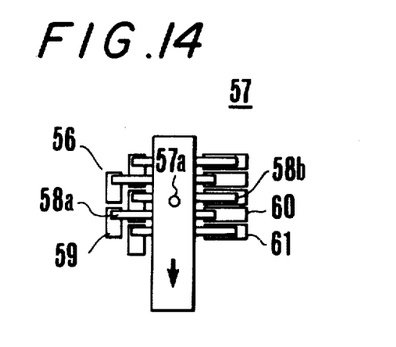
FIG. 14 shows an exposure light adjusting switching group 56 shown in FIG. 13, in detail.

FIG. 13 shows the exposure light quantity adjusting circuit in functional engagement of the shutter opening angle switching over device at the shutter driving part of the motion picture camera according to the present invention, whereby 51 the electric current source, 52 the light receiving element, 53 the diaphragm meter, 54 the film sensibility switching over resistance group, 55 the film sensibility switching over switch group and 56 the exposure light quantity adjusting switch group 56 are shown in FIG. 14, whereby 57 is the contact piece supporting body being slidable upwards and downwards and presenting a coupling hole 57a in which the pin 3 of the opening angle switching over slide plate 1 engages, 58 the contact consisting of a plural number of the contacts 58a, 58b and 59, 60 and 61 the contact conductive faces with which the contact 58 contacts. By means of the exposure light adjusting circuit 38 a proper exposure can always be obtained, by making the difference between the diaphragm step by means of the film sensibility switching over (EV) and that by means of the shutter opening angle switching over (EV) equal to each other in advance.

The operation of the shutter opening angle switching over device according to the above mentioned construction will be explained below.

The shutter opening angle switching over device in the shutter driving mechanism shown in FIGS. 11 and 12 is in the state in which the exposure is carried out at the narrow shutter opening angle. Here the lock part 40a of the switchover lock lever 4 is locked in the lock groove 1b for the narrow shutter opening angle of the opening angle switching over slide plate 1. Further in the state shown, the trigger lever 10 is drawn against the force of the compression spring 11 along the direction A while conventional mechanical or electrical means not shown in the drawing disengage the stopper wheel 33 and the stopper 35a to enable the rotation of the motor 16.

When the motor 16 rotates in the above mentioned state, the rotating power of the motor 16 is conveyed to the motor gear 18 by means of the motor shaft 16a and the friction member 17. When the motor gear rotates, the rotation of the motor 18 is conveyed to the shutter shaft 28 by means of the idler circular gear 19 and the shutter circular gear 22 and at the same time to the film winding shaft 32 by means of the circular gear 19 and the film winding up transmission gear. At this time the shutter circular gear 22 and the shutter elliptical gear 23 are secured on the shutter shaft 28 so that the shutter elliptical gear 23 is rotated by the rotation power of the idle circular gear 19. Also, the shutter elliptical gear 22 is always in engagement with the idle elliptical gear 20 so that the idle elliptical gear 20 is rotated at an irregular speed by means of the effect of the engagement between the elliptical gears while the idle elliptical gear 20 and the idle circular gear 19 are independent from each other so that both gears carry out different rotation movements. The photographing is carried out at the narrow shutter opening angle.

The switching over operation from the photographing at the narrow shutter opening angle to that at the wide shutter opening angle will be explained according to FIGS. 11 and 12.

When the narrow shutter opening angle is switched over to the wide shutter opening angle while the motor 16 is driven, the switching over operation is not sure, so that it is necessary to cut the current supply to the motor by means of a conventional means not shown in the drawing, by freeing the trigger lever 10 from the finger not shown in such a manner that by means of the spring 11 the trigger lever 10 is returned along the opposite direction to A (anti-clockwise). At the same time by means of a conventional mechanical or electrical means not shown in the drawing the stopper 35a engages with the stopper wheel 33 in such a manner that the driving of the motion picture camera is stopped. When at the same time the trigger lever 10 is returned by means of the spring 11 the trigger lever operation plate 8 has the tendency to be away from the tapered part 4b of the switching lock lever 4 so that the switching lever 4 is rotated anti-clockwise (along the direction C in the drawing) by means of the spring 6 until the switching over lever 4 contacts with the spacer 5 in such a manner that the lock part 4a is freed out of the lock groove 1b for the narrow opening angle of the opening angle switching over slide plate 1.

Thus the motion picture camera stands still completely. When then in order to switch over to the wide opening angle the opening switching over knob 2 is pushed down (along the direction D in the drawing), the switching over slide plate 1 is also lowered. When at this time the opening angle switching over lever 12 in contact with the tapered part 1c of the switching over slide plate 1 is rotated clockwise (along the direction E in the drawing) by means of the tapered part 1c and reaches run up surface 1e of the switching over slide plate 1 the downwards stroke of the switching over slide plate 1 is completed while at the same time by means of the pin 3 provided on the opening angle switching over knob 2 in functional engagement with the exposure light quantity adjusting circuit 38 the exposure is adjusted on the exposure light quantity adjusting circuit 38.

Because on the other hand the switching over lever 12 is rotated clockwise, by means of the steel ball 14 the idle circular gear 19 is slided toward the supporting plate 89 (along the direction F in the drawing) in such a manner that the projection 20a of the idle elliptical gear 20 engages in the groove 19a of the idle circular gear 19 while the engagement of the idle circular gear 19 with the shutter circular gear 22 is solved.

Thus the switching over of the opening angle is completed. When next the trigger lever 10 is drawn against the compression spring along the direction A in the drawing the switching over lock 4 is rotated clockwise along the direction C in the drawing similarly to the case of the narrow opening angle in such a manner that the lock part 4a of the switching over lock plate 4 is locked in the lock groove 1a for the wide opening angle of the opening angle switching over slide plate 1 while at the same time the motor 16 starts to rotate. The rotation of the motor 16 is by means of the motor shaft 16a and the friction member 17, conveyed to the motor gear 18 and the idle circular gear 19, the one rotation power of which is conveyed to the shutter shaft 28 by means of the idle elliptical gear 20 and the shutter elliptical gear 23. Now that the shutter elliptical gear 23 is engaged with the idle elliptical gear 20 in such a manner that the rotation angular speed of the shutter shaft 28 is low when the shutter blade opens the aperture 37, a larger effective opening angle can be obtained than driving standing still. At the same time the other rotation power of the idle circular gear 19 is conveyed to the film winding up transmission gear 31 so as to rotate the film winding up transmission shaft 32, whereby the already exposed film 27 is wound up. When on the contrary the photographing at the wide opening angle is to be switched over to that at the narrow opening angle, as explained in the case when the photographing at the narrow opening angle is switched over to that at the wide opening angle, the switching over is ready by simply freeing the trigger lever 10 from the finger and finished by simply pushing up the opening angle switching over knob 2.

Figures 15, 16:
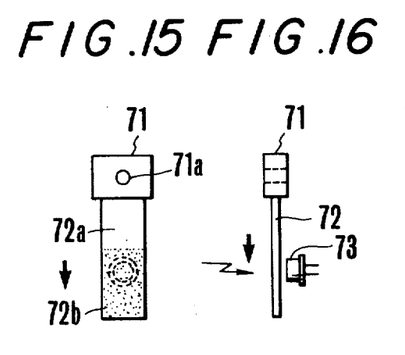
FIG. 15 is a front view of another variation of an embodiment of the exposure light adjusting means 38 shown in FIG. 11.
FIG. 16 is a side view of FIG. 15.

FIG. 15 and FIG. 16 show the second embodiment of the exposure light quantity adjusting means 38 in functional engagement with the shutter opening angle switching over device in the shutter driving mechanism of the motion picture camera according to the present invention, whereby in front of the light receiving element 73 for measuring light a ND filter 72 supported by the supporting body 71 is provided and the exposure light quantity can be adjusted by varying the density of the ND filter 72, whereby the part 72b with higher density of the ND filter 72 covers the light receiving element 73 for measuring light when the opening angle is narrow, while the part 72a with lower density, of the ND filter 72 covers the light receiving element 73 for measuring light when the opening angle is wide in order to intensify the illumination entering into the light receiving element 73 for measuring light so as to control the diaphragm meter and obtain a proper exposure.

Figure 17:
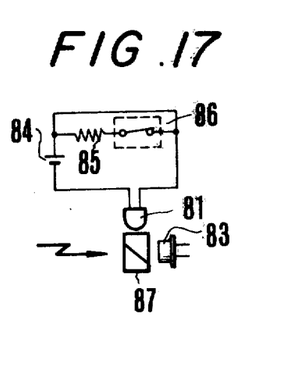
FIG. 17 shows further another variation of an embodiment of the exposure light adjusting means 38 shown in FIG. 11.

FIG. 17 shows the third embodiment of the exposure light quantity adjusting means 38 in functional arrangement with the shutter opening angle switching over device in the shutter driving part of the motion picture camera according to the present invention, whereby in front of the light receiving element 83 for measuring light a semipermeable mirror 82 is provided which mirror converts the light coming from the light source 81 into a beam for measuring light and leads it to the light receiving element for measuring light. FIG. 17 shows the state of the exposure light quantity adjusting means at the narrow opening angle, whereby the switch is opened wider according as the opening angle becomes wider in such a manner that the brightness of the light source 81 is increased while the illumination at the light receiving element 83 is increased in such a manner that the diaphragm meter moves toward the narrow side so as to obtain a proper exposure.

As mentioned above, the shutter opening angle switching over device in the shutter driving part of the motion picture camera according to the present invention presents a pair of elliptical gears and a pair of circular gear in the shutter driving system, whereby the driving power can selectively be conveyed either to a pair of the elliptical gears or to a pair of the circular gears in such a manner that the shutter opening angle can be switched over at least two steps while at the same time the exposure can be adjusted in functional engagement of the shutter opening angle so that a stabilized image can always be obtained.

Further on the shutter shaft and on its driving shaft a pair of the elliptical gears are mounted in such a manner that the shutter shaft rotates slowly when the shutter blade opens the aperture so as to obtain a wider opening angle than that at standing still, so that not only the darker object can be photographed but also a motion picture camera remarkably compact in its construction can be obtained.

What is claimed is:
1. A motion picture camera whose effective shutter opening angle is variable comprising;
    image forming optics,
    a driving means for producing driving power for said camera,
    a first rotating means,
    a rotatable shutter shaft comprising;
    a shutter blade movable into the path of light from the optics for intermittently covering a film to be exposed by rotation of said shutter shaft intermittently,
    a second rotating means provided in functional engagement with said first rotating means, one of said first and second rotating means being elliptical,
    a third rotating means, said third rotating means being circular, said first and third rotating means being mounted on said shaft for rotation therewith,
    a fourth rotating means coupled to said driving means to be driven thereby and capable of assuming a first position in which said fourth rotating means is in functional engagement with said third rotating means but out of the functional engagement with said second rotating means, said fourth rotating means being circular and while coupled to said driving means being capable of assuming a second position out of functional engagement with said third rotating means but in functional engagement with said second rotating means, switching means for manually switching said fourth rotating means between the first and second positions.

2. A motion picture camera according to claim 1, in which said switching means includes a moving means for moving said fourth rotating means parallel to said shutter shaft.

3. A motion picture camera according to claim 1, further comprising exposure light quantity adjusting means coupled to said switching means and responsive thereto for adjusting the exposure light to said film.

4. A motion picture camera according to claim 3, further comprising a diaphragm, said exposure light quantity adjusting means including an exposure meter for controlling the diaphragm and sensitivity varying means for varying the sensitivity of said exposure meter.

5. A motion picture camera according to claim 4, in which said sensitivity varying means includes a photoconductive element connected in series with said exposure meter and a plural number of the shunt circuits connected electrically parallel to said exposure meter and said photoconductive element.

6. A motion picture camera according to claim 3 in which said exposure light quantity adjusting means includes a filter disposed between the film and the image forming optics.

7. A camera as in claim 1, wherein said first and second rotating means are both elliptical.

8. A camera as in claim 1, wherein said rotating means are all gears.

9. A camera as in claim 1, wherein said first and second rotating means are engaged to rotate the shaft at a varying speed so that the shutter blade exposes the film longer when the fourth rotating means is in engagement with said second rotating means.

10. A camera as in claim 9, wherein said first and second rotating means are each elliptical.

11. A motion picture camera comprising:
a drive means for driving said camera,
an aperture for directing light from a scene toward a film,
a shutter means for alternately allowing the light through the aperture to pass toward the film,
a rotary shaft in said shutter means,
a shutter member in said shutter means and fixed to said rotary shaft to be rotated by said rotary shaft, said shutter means including a shutter blade coupled to said shutter member and movable for alternately blocking light from the aperture to the film and allowing light to pass toward the film during rotational motion of said shutter member,
a first rotating means in said shutter means and fixed to said rotary shaft,
a second rotating means in said shutter means and rotatably engaged to said first rotating means to rotate in cooperation with each other,
a third rotating means in said shutter means and fixed to said rotary shaft,
a fourth rotating means in said shutter means and engageable alternately with said second and third rotating means, selector means coupled to said fourth rotating means for selectively engaging said fourth rotating means with said third rotating means or said second rotating means, transmission means coupling said fourth rotating means to said drive means.

said third and fourth rotating means being circular and at least one of said first and second rotating means being elliptical so that the rotational speed of the rotary shaft varies when the selector means couples said fourth rotating means to said second rotating means from the speed which occurs when said selector means couples said fourth rotating means to said third rotating means.

12. A camera as in claim 11, wherein said first and second rotating means are each elliptical.

13. A camera as in claim 11, wherein said first and second rotating means have edges and are engaged to each other at the edges.

14. A camera as in claim 11, wherein said rotating means are each a gear having a toothed periphery.

15. A camera as in claim 11, wherein said first and second rotating means is each a gear.

16. A camera as in claim 11, in which said third and fourth rotating means is each a gear.

17. A camera as in claim 11, wherein said selector means is coupled to the aperture for adjusting the aperture.

18. A camera as in claim 17, wherein said diaphragm includes an iris and diaphragm adjusting means as well as a meter for controlling the iris in accordance with a current, said aperture including a photometric circuit for controlling the current to said diaphragm meter in accordance with the brightness of a scene being photographed.

19. A camera as in claim 18, wherein said photometric circuit includes a photographic switching element having a resistance value corresponding to the brightness of light from a scene and a diverging circuit for varying the sensitivity of the diaphragm meter.

20. A motion picture camera according to claim 18, including a first and a second power transmitting means respectively for rotating said rotary shaft with the help of driving power of said drive means alternatively, and a power switching means for imparting the driving power of said drive means alternatively to the first or the second power transmitting means, whereby, when the driving power of said drive means is imparted to said first power transmitting means, the time light from a scene object is incident upon said shutter member from said second aperture and incident upon said first aperture from said member being of longer duration than the case when the driving power of said drive means is imparted to said second power transmitting means.

21. A motion picture camera according to claim 20, in which said first power transmitting means includes a first elliptical gear fixed to said rotary shaft and a second elliptical gear coupled with said first elliptical gear as well as selectively coupled to said drive means.

22. A motion picture camera according to claim 20, in which said second power transmitting means includes a spur gear fixed to said rotary shaft and another spur gear arranged for alternately coupling to said spur gear as well as to said drive means.

23. A motion picture camera comprising:
a drive means for driving said camera,
an aperture system for directing light from a scene toward a film, a shutter means for alternately allowing the light through the aperture system to pass toward the film, a rotary shaft in said shutter means, a rotary shutter member coupled to said rotary shaft to be rotated by said rotary shaft and including a notched portion for alternately allowing light to pass through the aperture toward a film, a first gear fixed to the shaft for rotation therewith, a second gear engaging the periphery of the first gear, a third gear fixed to the shaft for rotating therewith, a fourth gear, selector means coupled to the fourth gear for selectively engaging said fourth gear with said third gear or said second gear, coupling means for imparting drive power of said drive means to said fourth gear, said third and fourth gears being circular and said first and second gears being elliptical and arranged in such a manner as to drive said member at a speed which exposes the film at a different rate when said fourth gear is coupled to said second gear then when it is coupled to the third gear.

24. A camera as in claim 23, wherein said aperture system includes a diaphragm and adjusting means for adjusting the diaphragm, said coupling means including means connected to said adjusting means for varying the opening of said aperture system.

25. A camera as in claim 24, wherein said diaphragm adjusting means includes diaphragm blades for forming an aperture opening and controlling it, said diaphragm adjusting means including a diaphragm meter for controlling the diaphragm blades in accordance with a voltage applied thereto, said adjusting means including a photometric circuit for controlling the voltage supplied thereto on the basis of the brightness of a scene to be photographed.

26. A camera as in claim 25, wherein said photometric circuit includes a photoelectric switching element having a resistance value varying in accordance with the brightness of light from a scene to which it is exposed, and a diverging circuit for varying the sensitivity of the diaphragm meter.

27. A camera as in claim 25, wherein said photometric circuit includes a photoelectric transducing element having a resistance corresponding to the brightness of light from a scene to which the element is exposed, and a filter member for varying the resistance value of said photoelectric transducing element.

28. A motion picture camera, comprising an optical system, a drive means for driving film in the camera, a film gate means for defining a film feed path, said film path passing said optical system, said optical system having first aperture means for forming an opening along one portion of the path, second aperture means having an opening in the path of light from a scene and a further having a diaphragm for varying the opening, film feeding means for intermittently supplying film past said first aperture means, said film feeding means including a film feeding claw for imparting intermittent motion to the film and control means for controlling the film feed operation of said film feeding claw, rotatable shutter means in the path of light passing through said optical system and said first aperture means, said shutter means being coupled to said drive means, said film feeding claw and said control means being connected to said drive means, varying means for discontinuously varying the time of light from a scene passing toward said first aperture means through said shutter means, said time varying means being mechanically linked with said shutter means, said second aperture means including diaphragm adjusting means for adjusting the diaphragm, said diaphragm adjusting means including a diaphragm meter and a diaphragm controlling member for controlling the diaphragm, said diaphragm meter being coupled to said diaphragm controlling member and controlling the diaphragm controlling member in accordance with an electrical value, said adjusting means including a photometric circuit for providing electrical values to said meter in dependence upon the brightness of light from a scene, said circuit including a photoelectric transducing element having a resistance value variable in accordance with the brightness of light from the scene and a diverging circuit for varying the sensitivity of the diaphragm meter, said diverging circuit including a plurality of resistance circuits, said resistance circuits being selectively connected in parallel with said diaphragm meter to a power source, said diverging circuit including a plurality of switching means for selectively connecting said resistance circuits in parallel with said diaphragm means to the power source, said switching means being arranged in series with said resistance circuit to said power source and mechanically linked to said varying means so as to function in cooperation with the operation of the variation of said varying means.

29. A motion picture camera comprising a drive means for driving said camera, an optical system having a film gate means for defining a film feeding path and first aperture means forming a first opening at one portion of said path, a second aperture means having a second opening, said opening in the path of light from a scene outside of said camera, said second aperture means having a diaphragm for forming and varying the second opening, a film feeding means coupled to said drive means for supplying said film intermittently to said first aperture means, said film feeding means comprising, a film feeding claw coupled to said drive means for supplying said film intermittently, control means coupled to said drive means for controlling said film feeding operation of said film feeding claw, a rotatable shutter means coupled to said drive means for controlling alternatively the light from a scene passed through said second aperture means to be incident upon said first aperture means, varying means coupled to said shutter means for discontinuously varying the time of the light from a scene passed through said first aperture means and said shutter means, a diaphragm adjusting means for controlling said diaphragm and varying the opening of said second aperture means, said diaphragm adjusting means comprising, a diaphragm meter mechanically linked to said diaphragm controlling member so as to control said diaphragm controlling member corresponding to an electrical quantity, a photoelectric transducing element electrically connected with said diaphragm meter so as to control said diaphragm meter and having a resistance value variable according to the brightness of a scene so as to control the electric value supplied to said diaphragm meter, a filter member disposed at the front surface of said photoelectric transducing element for varying the response of said photoelectric switching element due to said brightness of the scene, said member being movable stepwise and interlocking with said varying means so as to vary the light transmitted through the filter member.

30. A motion picture camera according to claim 29, in which said shutter means includes a rotary shaft having a shutter member, a first and a second power transmitting means respectively alternately connected for rotating said rotary shaft alternatively in response to said drive means, and a power switching means for imparting the driving power of said drive means alternatively to the first or the second power transmitting means, so that when the driving power is imparted to said first power transmitting means, the light from a scene passes through said second aperture and said first aperture is longer than when the driving power of said drive means is imparted to said second power transmitting means.

31. A motion picture camera according to claim 30, in which said first power transmitting means includes an elliptical gear fixed to said rotary shaft and another elliptical gear engaged with said elliptical gear and selectively coupled to said drive means.

32. A motion picture camera according to claim 30, in which said second power transmitting means includes a spur gear fixed to said rotary shaft and another spur gear selectively engageable with said spur gear and mechanically linked to said drive means.

33. A motion picture camera comprising
a drive means for actuating said camera,
an optical system having film gate means for limiting the film feeding path, and a first aperture means opened within the film feeding path,
a second aperture means having the opening for light from a scene outside of said camera,
a rotatable shutter means for controlling the light through said second aperture means incident upon said first aperture means, said shutter means being coupled to said drive means,
means coupled to said shutter means for varying the shutter time of said shutter means stepwise, said time varying means being mechanically linked to said shutter means.
means for controlling the light through said second aperture means,
a scene brightness detection means for detecting the brightness of said light form a scene object and for controling said incident light amount control means corresponding to a detecting signal of said detection means,
means for correcting the amount of the detecting output of said object brightness detection means, said correcting means being electrically connected with said object brightness detection means as well as being mechanically linked to said time varying means, said correcting means being coupled to the varying means to correct discontinuously the amount of the detecting output of said object brightness detection means in cooperation with said discontinuous function of variation effected by said time varying means.

34. A motion picture camera according to claim 33, in which said shutter means includes a rotary shaft having a shutter member, a first power transmitting means selectively coupled to said drive means for rotating said rotary shaft and a power switching means for alternatively imparting the driving power of said drive means to the first or the second power transmitting means, so that when the driving power of said drive means is imparted to said first power transmitting means, the shutter opening time is longer than when the driving power of said drive means is imparted to said second power transmitting means.

35. A motion picture camera according to claim 34, in which said first power transmitting means includes an an elliptical gear fixed to said rotary shaft and another elliptical gear coupled with said elliptical gear and selectively linked to said drive means.

36. A motion picture camera according to claim 34, in which said second power transmitting means is provided with a spur gear fixed to said rotary shaft and another spur gear engageable with said spur gear and mechanically linked to said drive means.

* * * * *